US008912253B2

(12) United States Patent
Montes et al.

(10) Patent No.: US 8,912,253 B2
(45) Date of Patent: Dec. 16, 2014

(54) EASY-TO-INSTALL ELECTRICAL CABLE

(75) Inventors: Sergio A. Montes, Monterrey (MX); Hector R. Lopez, Coah (MX); Patricio G. Murga, Monterrey (MX); Victor M. Rodriguez, San Luis Potosi (MX)

(73) Assignee: Conductores Monterrey, S.A. DE C.V., Nuevo Leon (MX)

( * ) Notice: Subject to any disclaimer, the term of this patent is extended or adjusted under 35 U.S.C. 154(b) by 1040 days.

(21) Appl. No.: 12/731,753

(22) Filed: Mar. 25, 2010

(65) Prior Publication Data

US 2010/0255186 A1 Oct. 7, 2010

Related U.S. Application Data

(60) Provisional application No. 61/166,106, filed on Apr. 2, 2009.

(51) Int. Cl.

| | |
|---|---|
| ***C08J 3/22*** | (2006.01) |
| ***H01B 13/24*** | (2006.01) |
| ***H01B 7/295*** | (2006.01) |

(52) U.S. Cl.

CPC ................ *H01B 7/295* (2013.01); *H01B 13/24* (2013.01)

USPC ............ 523/351; 524/506; 525/103; 427/117

(58) Field of Classification Search

USPC ............ 524/506; 525/103; 427/117; 523/351

See application file for complete search history.

(56) References Cited

U.S. PATENT DOCUMENTS

| | | | | |
|---|---|---|---|---|
| 5,707,732 | A | 1/1998 | Sonoda et al. | |
| 6,228,495 | B1 | 5/2001 | Lupia et al. | |
| 2002/0001715 | A1 | 1/2002 | Redondo et al. | |
| 2003/0096904 | A1 | 5/2003 | Hakuta et al. | |
| 2006/0151758 | A1 | 7/2006 | Reyes | |
| 2009/0186971 | A1 * | 7/2009 | Grant et al. | 524/300 |
| 2010/0101822 | A1 * | 4/2010 | Bunker et al. | 174/110 SR |

FOREIGN PATENT DOCUMENTS

| | | |
|---|---|---|
| WO | WO-2008112393 | 9/2008 |

OTHER PUBLICATIONS

International Search Report and Written Opinion dated Aug. 10, 2011 in related International Application No. PCT/IB10/00671.

* cited by examiner

*Primary Examiner* — Hannah Pak

(74) *Attorney, Agent, or Firm* — Kilpatrick Townsend & Stockton LLP

(57) ABSTRACT

A thermoplastic material, and in particular a jacket for an electrical cable, and more particularly a jacket for a THHN electrical cable, includes a polyamide base material, a silicon elastomer and an ethylene polymer modified with an unsaturated aliphatic diacid anhydride. The silicon elastomer does not migrate through the jacket. The jacket has a lower coefficient of friction than a cable with a jacket that does not have a silicon elastomer incorporated therein, and the resulting cable requires less force to install than a cable without a lubricant incorporated therein. The cable also has improved flame resistance and elongation-to-break properties. Methods for making these thermoplastic materials are also described.

7 Claims, 1 Drawing Sheet

EASY-TO-INSTALL ELECTRICAL CABLE

CROSS REFERENCE TO RELATED APPLICATION

This application claims the benefit of U.S. Provisional patent application Ser. No. 61/166,106, filed Apr. 2, 2009, which is incorporated herein by this reference.

TECHNICAL FIELD

The present application generally relates to thermoplastics, and more specifically to lubricated electrical cable having a thermoplastic sheath and methods for making lubricated electrical cable.

BACKGROUND

Electrical cables used in housing and industrial projects typically include an electrical conductor surrounded by at least one additional layer of material. In some cases, an insulating layer of material is used to insulate the conductor. The insulating layer is then surrounded by a layer of thermoplastic material, and this outermost layer may be referred to as a "sheath" or a "jacket." Installation of electrical cable requires the cable to be threaded or passed through sections of a building, such as walls, ceilings, ducts and other conduits.

The most common electrical cable used in housing and industrial projects in the United States is called THHN ("Thermoplastic High Heat-resistant Nylon coated"). A typical THHN cable uses copper as an electrical conductor, polyvinyl chloride as the insulating material and nylon as the sheath material.

It has long been known to provide a lubricant on the sheath of the cable in order to reduce the coefficient of friction of the cable and make the cable easier to pull through conduit and other building structures during installation. Such methods have included manually applying a lubricant to the sheath just prior to installation, adding a separate lubricating layer to the sheath, and, most preferably, incorporating the lubricant into the sheath prior to forming the sheath.

The sheath layer is typically formed over the conductor core and insulating layer by an extrusion method. A lubricant can be incorporated directly into the cable sheath prior to extrusion by several methods, including but not limited to:

a) adding the lubricant to the sheath material and allowing the lubricant and sheath material to mix during the extrusion process;

b) pre-mixing the lubricant with the sheath material prior to adding the sheath material to the extruder; and c) pre-forming a highly concentrated lubricant composition (i.e., a masterbatch) and adding this composition to the sheath material in the extruder hopper.

For cost and other considerations, it is preferable to utilize a masterbatch composition to form the lubricated cable sheath. Silicone-based masterbatch compositions are described in, e.g., U.S. Pat. Nos. 7,410,695, 6,080,489, 5,708,084 and 5,391,594. Commercial masterbatches made of silicon rubber dispersed in a number of carrier resins, including nylon, are well known in the art.

Masterbatch compositions are formed by a melt mixing process, in which the masterbatch components are combined in a mixer, heated and blended. Once the temperature required to ensure sufficient blending of the components is reached the mix is removed from the mixer, cooled, and diced or pelletized.

A masterbatch composition must contain a base material that is compatible with the material into which the masterbatch composition will be added—if they are not compatible the masterbatch composition will not mix well with the base material and cannot easily be incorporated into the material. Thus, masterbatch compositions designed for incorporation into a nylon product (e.g., the nylon jacket of a THHN cable) have traditionally contained nylon as a base material because of incompatibility issues between the nylon product and other known masterbatch base materials such as polyethylene.

It is particularly difficult to make a masterbatch composition containing nylon and a silicon elastomer, however, because of volatility problems. The melt mixing process for these components requires temperatures of approximately 230-250° C. At these temperatures, commercial silicon elastomer materials such as methyl vinyl silicon rubber ("VMQ")—as classified according to ASTM D-1418—produce volatile materials that vaporize during the melt mixing process, resulting in excessive porosity of the masterbatch composition. It would thus be preferable to avoid using nylon as a base material in a silicon elastomer masterbatch composition.

Polyethylene-based silicon elastomer masterbatches are known and can be made in a melt mixing process at temperatures of about 130-150° C. These lower processing temperatures cure the excessive porosity problems inherent in nylon-based silicon elastomer masterbatch compositions. Polyethylene-based silicon elastomer masterbatches have previously been found to be unsuitable for use in nylon-based products, however, because of the incompatibility problems discussed above.

It would thus be desirable to form a lubricated thermoplastic article from a masterbatch composition containing a silicon elastomer that does not suffer from excessive porosity problems caused by volatilization of silicon elastomer components during the manufacture of the masterbatch composition. More specifically, it would be desirable to form a lubricated nylon sheath for a THHN electrical cable using a silicon-based masterbatch composition that (1) does not have the excessive porosity problems of nylon-based silicon masterbatches and (2) is compatible with the nylon base material.

SUMMARY

In one embodiment of this invention, a masterbatch composition includes a silicon elastomer and an ethylene polymer modified with an unsaturated aliphatic diacid anhydride. The silicon elastomer is preferably a VMQ silicon elastomer having a Shore A hardness of from about 35 to about 75, and more preferably has a Shore A hardness of about 60 to about 75.

The masterbatch composition preferably contains about 15-50% by weight ethylene polymer modified with an unsaturated aliphatic diacid anhydride and about 50-85% by weight silicon elastomer, and more preferably contains about 30% by weight ethylene polymer modified with an unsaturated aliphatic diacid anhydride and about 70% by weight silicon elastomer.

In another embodiment, a thermoplastic material includes polyamide, an ethylene polymer modified with an unsaturated aliphatic diacid anhydride, and a silicon elastomer. The thermoplastic material preferably contains about 80-95% by weight polyamide, about 0.75-10% by weight ethylene polymer modified with an unsaturated aliphatic diacid anhydride and about 2.5-17% by weight silicon elastomer.

In another embodiment, the thermoplastic material is a jacket for an electrical cable, and more preferably is a jacket for a THHN electrical cable. The silicon elastomer preferably does not migrate through the thermoplastic material. Thermoplastic materials described herein have substantially improved flame resistance as compared to a thermoplastic material having no silicon elastomer incorporated therein.

In yet another embodiment, the jacket of a THHN electrical cable contains about 88% by weight polyamide, about 8.5% by weight silicon elastomer and about 3.5% ethylene polymer modified with an unsaturated aliphatic diacid anhydride.

The jacket of a THHN electrical cable optionally further includes one or more of a filler, processing lubricant, UV absorber, antioxidant, partitioning agent and pigment.

The THHN electrical cable has a lower coefficient of friction than a cable with a jacket that does not have a silicon elastomer incorporated therein, and requires less force to install than a cable without a lubricant incorporated therein. In addition, the cable has substantially improved flame resistance and elongation-to-break properties as compared to a cable having no silicon elastomer incorporated therein.

In another embodiment, a method for forming a THHN electrical cable having an electrical conductor, insulating layer and jacket is described. In the method, a masterbatch composition is formed having a silicon elastomer and an ethylene polymer modified with an unsaturated aliphatic diacid anhydride. The masterbatch composition is mixed with a polyamide base material, and the jacket is extruded from the masterbatch composition and polyamide base material around the electrical conductor and insulating layer.

DETAILED DESCRIPTION

Figure 1:
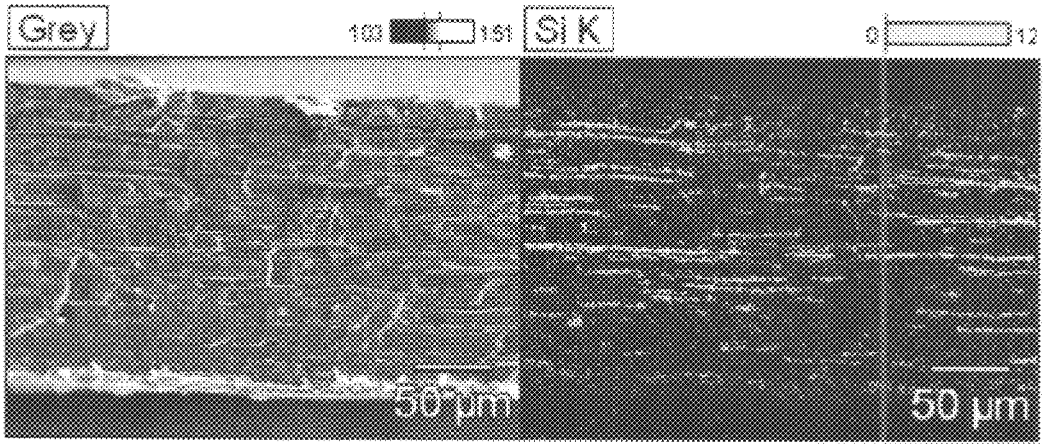
FIG. 1 is a Scanning Electron Microscope image and silicon map for a first section of cable jacket formed according to one embodiment of the invention.

Generally speaking a masterbatch composition can include a silicon elastomer mixed with a polymer having a melting or softening temperature below about 160° C. and showing functional compatibility with a nylon resin. The term "functional compatibility" is meant to indicate that although a silicon elastomer is expected to form a separate phase within the polymer, no deleterious effect on jacket properties is observed, as it will be explained in detail below. Preferably, a masterbatch composition can include an ethylene polymer base mixed with a silicon elastomer (silicon rubber). The ethylene polymer is an ethylene-based polymer material modified with an unsaturated aliphatic diacid anhydride ("ADA"), typically through a grafting process, although a copolymerization technique could also be used. The ethylene polymer can also be a copolymer such as poly (ethylene-co vinyl acetate), poly(ethylene-co-glycidyl methacrylate), poly (ethylene-co-maleic anhydride), poly(ethylene-co-acrylic acid), poly(ethylene-co-methyl acrylate), poly(ethylene-co-ethyl acrylate), poly(ethylene-co-butyl acrylate), poly(ethylene-co-methacrylic ester), poly (ethylene-co-butyl acrylate-co-carbon monoxide), or poly(ethylene-co-vinyl acetate-co carbon monoxide). The masterbatch composition can be formed at lower temperatures (130-150° C.) than a typical nylon-based masterbatch. The lower processing temperatures allow formation of the masterbatch with minimal volatilization of the silicon elastomer materials in the composition. The masterbatch composition thus does not suffer from the excessive porosity problems common in silicon masterbatches formed from other thermoplastic materials having a melting point higher than about 160° C.

It has been surprisingly discovered that if an ethylene homopolymer or copolymer is modified with an unsaturated ADA, the resulting ethylene polymer-based masterbatch composition is compatible with the thermoplastic material (e.g., polyamide (nylon) in the THHN cable sheath). The unsaturated ADA appears to improve the compatibility of the components by bonding with the nylon in the sheath material.

The silicon elastomer, when included in the jacket material, reduces the coefficient of friction of the jacket, making the cable easier to install in residential, commercial and industrial applications.

Preferred silicon elastomers are VMQ types having a Shore A hardness of from about 35 to about 75 directly obtained by means of polymerization and later optionally formulated with processing lubricants and fillers. More preferably, the silicon elastomer has a Shore A hardness of from about 60 to about 75. It is also possible to obtain the desired hardness by means of a solid mix between two silicon elastomers of different hardnesses.

More preferred silicon elastomers are Silopren HV2/2160 (Silopren®) and Silplus SE 6060. Silopren HV2/2160 is a translucent, solid mixture of polydimethylsiloxane (CAS Reg. No. 70131-67-8), dimethylvinyl terminated, dimethyl methylvinyl siloxane (CAS Reg. No. 68083-18-1), and treated filler (Silanamine, 1,1,1-trimethyl-N-(trimethyl silyl)-, hydrolysis products with silica, CAS Reg. No. 68909-20-6). Silopren® is available from GE Bayer Silicones GmbH & Co. KG in Leverkusen Germany. Silplus 60 MP is a translucent, physical solid mixture of Silplus SE 6035 and Silplus SE 6075 in a relationship of from 30/70 to 35/65 respectively. Silplus SE 6035 is a translucent, solid mixture of dimethylvinyl terminated, dimethyl methylvinyl siloxane (CAS Reg. No. 68083-18-1), and treated fumed silica (CAS Reg. No. 68583-49-3). Silplus SE 6075 is a translucent, solid mixture of mixed cyclosiloxanes (CAS Reg. No. 69430-24-6), octamethylcyclotetrasiloxane (CAS Reg. No. 556-67-2), vinyl stopped polydimethylsiloxane (CAS Reg. No. 68083-18-1), treated fumed silica (CAS Reg. No. 68583-49-3), dimethylpolysiloxane (CAS Reg. No. 70131-67-8) and dimethyl, methoxy terminated siloxanes and silicones (CAS Reg. No. 68951-97-3). Both are available from Momentive Performance Materials.

A preferred unsaturated ADA-grafted ethylene polymer is Fusabond® MB-265D ("Fusabond®"), which is a maleic anhydride-modified high-density polyethylene ("HDPE") available from DuPont™. An additional unsaturated ADA-grafted ethylene polymer includes Fusabond® E MB-528D, which is a maleic anhydride-modified linear low-density polyethylene ("LLDPE") available from DuPont™. It is believed that other ADA-grafted ethylene polymers would also be appropriate for this application, provided that they can be melt blended at a temperature below about 160° C. It is also possible that other functional groups, such as acrylic acid, methacrylic acid, glycidyl methacrylate, fumaric acid, tetrahydrophthalic anhydride or monoethyl maleate could be attached or copolymerized with a low melting point polymer material to produce the same effects described herein. When it is desired to reduce the concentration of ADA-grafted ethylene polymer in a given composition, it is also possible to add an appropriate amount of the ungrafted ethylene copolymer or homopolymer.

The concentration of silicon elastomer in the ethylene polymer-based masterbatch composition can be selected so as to provide a desired final silicon elastomer concentration in the extruded article (e.g., the THHN cable sheath). Any silicon elastomer concentration that allows for compatibility between the ethylene polymer and base thermoplastic material can be selected. A preferred masterbatch composition contains from about 50 to about 85% silicon elastomer and from about 50 to about 15% ethylene polymer modified with an unsaturated aliphatic diacid anhydride. More preferably, the composition contains about 70% silicon elastomer and about 30% ethylene polymer modified with an unsaturated aliphatic diacid anhydride, and, as discussed above, does not contain any nylon. Once blended, the masterbatch composition is formed into homogeneous pellets. The pellets can then be combined with the nylon (or other thermoplastic) jacket material at, e.g., the extruder hopper in the jacket forming process. The formed THHN cable jacket contains about 80-95% nylon and about 5-20% masterbatch composition, and more preferably about 88% nylon and 12% masterbatch composition. A THHN cable jacket incorporating a 12% masterbatch composition having a 70/30 ratio of silicon elastomer to ethylene polymer modified with an unsaturated aliphatic diacid anhydride would thus contain approximately 8.5% silicon elastomer (i.e., 70% of 12%).

Although, as described above, the masterbatch composition is preferably formulated for use with nylon jacket material, the composition could also be combined with polyolefin-based resins to reduce the coefficient of friction of many possible products such as films, fibers, tubes, wire and cable jacket and insulations, optical fiber conduits and the like. The masterbatch composition can be used in common thermoplastic formation methods, including, but not limited to extrusion, injection molding and compression molding processes. The masterbatch composition may also improve the hydrophobicity of the material in which the masterbatch composition is incorporated, which could be useful in the manufacture of various articles such as insulation for spacer cables and accessories for the spacer cables.

The masterbatch composition can include other additives such as fillers, processing lubricants, UV absorbers, antioxidants and pigments as long as these additives do not negatively affect the compatibility of the thermoplastic resin with the ethylene polymer. In one embodiment, the masterbatch composition contains approximately 5-10% fumed silica filler which is added to increase the rigidity and consistency of the masterbatch pellet. A preferred fumed silica is Hisil 233, available from PPG Industries, Pittsburgh, Pa.

An antioxidant can be added to protect ethylene based polymers from the high temperatures associated with nylon extrusion. The antioxidants can be of the phenolic or aminic types, among others. These antioxidants can be used alone or blended with other antioxidants.

Other possible additives could be incorporated into the masterbatch composition according to known principles.

The present application also relates to methods for forming the ethylene-based masterbatch composition. A silicon elastomer is combined with an ethylene polymer modified with an unsaturated aliphatic diacid anhydride to achieve a composition having the desired silicon elastomer concentration. In a preferred embodiment, from about 50 to about 85% silicon elastomer is combined with from about 15 to about 50% ethylene polymer modified with an unsaturated aliphatic diacid anhydride. More preferably, the composition contains about 70% silicon elastomer and about 30% ethylene polymer modified with an unsaturated aliphatic diacid anhydride. The components, including any additional optional additives, are melt-mixed in a mixer, e.g., a Banbury mixer, until the masterbatch composition is well-blended. The composition is removed from the mixer, cooled, and diced or pelletized. Typical melt-mix temperatures for ethylene polymer-based masterbatch compositions are from about 130-150° C. These relatively low temperatures (as compared to melt mix temperatures for typical nylon-based masterbatch compositions) minimize the vaporization of volatile materials from the silicon elastomer that would otherwise result in excessive porosity in the masterbatch composition. After the material is ground, diced or pelletized, an appropriate partitioning agent such as ground silica can optionally be added to prevent agglomeration and to facilitate handling and feeding into an extruder, injection molding machine or the like.

The preformed masterbatch composition can be mixed into a thermoplastic base material (e.g., nylon 6 or 66) and extruded or injection molded according to known methods. For nylon jacketing, typical extrusion temperatures are from about 249 to about 266° C.

When used in the formation of a nylon jacket of an electrical cable (e.g., a THHN cable), the masterbatch is blended with nylon pellets or continuously fed at the extruder hopper and then extruded over the PVC based sheath material. The nylon sheath thus has a silicon elastomer thoroughly mixed therein. The lubricated cable sheath gives the cable a lower coefficient of friction than a non-lubricated cable and reduces the pulling force required to install the cable. The cable is thus easier to install than a non-lubricated cable.

The present application also relates to a lubricated cable jacket having a silicon elastomer incorporated therein. The silicon elastomer does not migrate, or bloom, through the cable sheath—it is instead relatively homogeneously distributed throughout the cable sheath. The silicon elastomer on the outermost surface of the sheath provides a surface with a lower coefficient of friction than a cable sheath having no lubricant incorporated therein.

Surprisingly, as shown in the Examples below, THHN cables formed according to the embodiments described herein have improved flame resistance properties as compared to traditional lubricated and unmodified (non-lubricated) THHN cables. Apparently the relatively low volatility of the silicon elastomers used in the embodiments described herein as compared to previously known liquid lubricants contributes to the improvement in flame resistance.

Furthermore, as shown in the Examples, THHN cable jackets formed according to the embodiments described herein are more flexible (i.e., have a greater elongation-to-break ratio) than unmodified/non-lubricated THHN cables. Since it is known that an increase in nylon crystallinity reduces elongation-to-break, the improvement in flexibility is apparently due to a reduction in the overall crystallinity level in the nylon phase induced by the presence of the silicon elastomer.

Inclusion of the silicon elastomers according to the embodiments described herein into thermoplastic articles other than electrical cables could result in similar improvements in the flame resistance and flexibility (i.e., elongation-to-break) properties of these articles.

The masterbatch composition and lubricated cable sheath formed therefrom is described in the following examples, which are not intended to limit the scope of the disclosure contained herein:

EXAMPLES

Various masterbatch compositions were formed by combining the listed ingredients in the following amounts and melt mixing them at a temperature of 150° C.

TABLE 1

Masterbatch Compositions

| Ingredient | Example 1 PHR | 2 PHR | 3 PHR | 4 PHR | 5 PHR | 6 PHR |
|---|---|---|---|---|---|---|
| Silicon elastomer, 75 Shore A hardness (1) | | 100 | 100 | | | |
| Silicon elastomer, 60 Shore A hardness (2) | 100 | | | 100 | | |
| Silicon elastomer, 60 Shore A hardness (3) | | | | | 100 | 100 |
| ADA-grafted HDPE copolymer (4) | | | 33 | 40 | 40 | 40 |
| ADA-grafted LLDPE copolymer (5) | 100 | 50 | | | | |
| HDPE (6) | | 50 | | | | |
| Reinforcing silica (7) | 5 | | | | | 3 |
| Polyethylene wax (8) | | | | | | 1 |
| Total: | 205 | 200 | 133 | 140 | 140 | 144 |

PHR = Parts per hundred elastomer
(1) Silplus SE 6075, available from Momentive Performance Material Materials, Albany, NY
(2) Silopren HV 2/2160, available from GE Bayer Silicones, Wilton, CT
(3) Silplus 60 MP, available from Momentive Performance Material Materials, Albany, NY
(4) Fusabond MB 265D available from DuPont, Wilmington, DE
(5) Fusabond MB 528D available from DuPont, Wilmington, DE
(6) DGDL-3364 NT available from Dow Chemical, Midland, Michigan
(7) Hisil 233, available from PPG Industries, Pittsburgh, PA
(8) Epolene N14P, available from Westlake Chemical, Longview TX After melt-mixing, the masterbatch composition was cooled and pelletized. 100 parts of nylon 6 (Nycoa 1637, available from Nylon Corporation of America, Manchester, N.H.) in pellet form was well-mixed with 2 parts of black color masterbatch and with 12 parts of the masterbatch compositions listed in Table 1. The resulting pellet blend was then fed to an extruder to form a jacket of a conductor size 1/0 AWG THHN cable being extruded at a line speed of 100 meters per minute. No porosity was observed in any of the jackets. The cable samples were conditioned at room temperature for about 12 hours and then tested for pulling force according to the following procedure. The cable was pulled through a set-up made from a PVC conduit having a 1 inch in diameter and 3 straight sections connected with two 90 degree elbows. The length of these sections were: 180 in, 30 and 60 in. The cable was pulled at an approximate speed of 10 meters per minute while recording the pulling force by means of a load cell. Three pulls were averaged for both the unmodified nylon 6 cable and each of the samples produced using the masterbatches listed in Table 1. The results, shown in Table 2, indicate that pulling force is substantially reduced when a silicon elastomer masterbatch is added to the nylon jacket of a THHN cable. Pulling force reductions on the order of 50-60% were obtained. It can also be observed from Tables 1 and 2 that silicon elastomers having a Shore A hardness range of between 60 and 75 are effective in reducing the friction of nylon jackets of THHN cables.

TABLE 2

Cable Pulling Forces, kg

| Masterbatch number (from Table 1) | Example 1 | 2 | 3 | 4 | 5 | 6 |
|---|---|---|---|---|---|---|
| Unmodified nylon jacket | 34.8 | 34.8 | 34.8 | 34.8 | 34.8 | 36.4 |
| Nylon jacket with 12 parts masterbatch | 17.1 | 16.4 | 17.1 | 16.8 | 14.3 | 15.5 |
| Pulling force reduction, % | 50.9% | 52.9% | 50.9% | 51.6% | 59.1% | 57.4% |

In a second series of experiments, 100 parts of nylon were combined with 2 parts of a color masterbatch and 15 parts of the masterbatch described in Example 6. The results, shown in Table 3, indicate that further reductions in pulling force are possible when a masterbatch concentration is increased and a color masterbatch is added to the nylon jacket. As shown in Table 3, pulling force reductions on the order of 50-65% were obtained.

TABLE 3

Pulling force of colored THHN cables, kg

| | Example 7 | 8 | 9 | 10 |
|---|---|---|---|---|
| Jacket color | Red | Green | Purple | Pink |
| Unmodified nylon jacket | 39.23 | 28.07 | 39.23 | 39.23 |
| Nylon jacket with 15 parts masterbatch formed according to Example 6 | 15.7 | 13.17 | 14.12 | 14.5 |
| Pulling force reduction, % | 60.0% | 53.1% | 64.0% | 63.0% |

In order to investigate the effect of the addition of silicon masterbatch on the flame resistance of THHN cables, a series of 1/0 AWG samples were prepared varying both the masterbatch composition and the masterbatch concentration. Example 11 is a commercially available lubricated cable jacket, Example 12 is one of our unmodified cable jackets, and the Examples 13-18 are cable jackets incorporating the indicated percentage of masterbatch composition using the masterbatch composition of Examples 1-5 above, respectively. The competitive cable jacket, advertised as a nylon having a reduced coefficient of friction, was found to contain silicon oil. The samples were then subjected to the vertical flame test VW-1 as described in UL 1581 ("Reference Standard for Electrical Wires, Cables, and Flexible Cords"). In this test, a cable sample is subjected to a standardized flame for 15 seconds five times. Table 4 shows the duration of the flame after each application. It is evident in all cases that addition of the masterbatch composition described herein improves the flame resistance of a THHN cable, as compared to an unmodified nylon jacket.

TABLE 4

| Behavior of 1/0 AWG THHN samples in VW-1 flame test | | | | | | | | |
|---|---|---|---|---|---|---|---|---|
| | Example | | | | | | | |
| Sample | 11 Prior art Lubricated | 12 Unmod-ified | 13 MB 1 | 14 MB 1 | 15 MB 2 | 16 MB 3 | 17 MB 4 | 18 MB 5 |
| MB, wt % | — | 0 | 6 | 8 | 8 | 12 | 12 | 12 |
| Sample | Duration of flame (s) | | | | | | | |
| 1 | 14.0 | 23.0 | 2.0 | 3.3 | 1.3 | 3.7 | 1.7 | 14.3 |
| 2 | 17.3 | 1.7 | 3.0 | 1.3 | 4.3 | 1.0 | 1.3 | 0.7 |
| 3 | 1.3 | 2.0 | 4.0 | 0.7 | 2.3 | 0.7 | 1.0 | 0.7 |
| 4 | 1.3 | 2.7 | 0.0 | 0.0 | 0.0 | 0.7 | 1.0 | 0.0 |
| 5 | 2.7 | 1.7 | 0.0 | 0.0 | 0.0 | 0.7 | 0.3 | 0.7 |
| Sum | 36.7 | 31.0 | 9.0 | 5.3 | 8.0 | 6.7 | 5.3 | 16.3 |

Another beneficial result of the addition of silicon elastomer to the nylon jacket of THHN cables is the increase of flexibility of the jacket, as measured by an elongation-to-break test. Table 5 shows values of elongation-to-break of jackets taken from normal production samples of various conductor sizes, both for the unmodified nylon and for the jackets of the present invention made by adding 15% of the masterbatch composition formed according to Example 6 to a nylon 6 compound for THHN cables. In all cases the elongation-to-break increases as a result of the addition of silicon elastomer. Consequently, THHN cables made according to the present invention, by virtue of having a jacket of increased flexibility, show greater resistance to splitting and tearing during field installation, especially where lower temperatures cause the jacket to stiffen (e.g., in the winter season).

TABLE 5

| Elongation-to-break of THHN cable jacket, % | | |
|---|---|---|
| Conductor size, AWG | Unmodified nylon | Nylon + MB |
| 1/0 | 265 | 280 |
| 2/0 | 256 | 263 |
| 3/0 | 272 | 286 |
| 4/0 | 258 | 287 |
| 250 | 243 | 284 |
| 350 | 241 | 265 |
| 500 | 244 | 273 |
| 600 | 267 | 303 |

Figure 2:
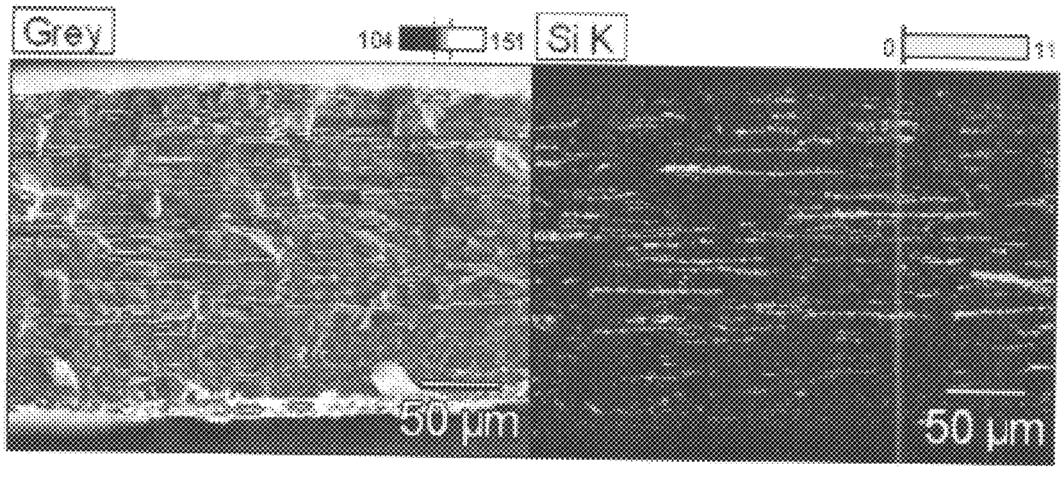
FIG. 2 is a Scanning Electron Microscope image and silicon map for a second section of cable jacket formed according one embodiment of the invention.

In order to determine the uniformity of distribution of the silicon elastomer, samples of jacket taken from THHN cables made with unmodified nylon and from nylon modified with the masterbatch described in Example 3 were subjected to a silicon mapping test using an scanning electron microscope (SEM) Jeol JSM 7401F. The silicon rubber is found to be uniformly distributed throughout the nylon jacket in the form of elongated fiber-like features, which is to be expected from a polymer blend which is subjected to extrusion forces and then cooled down. This is shown in FIGS. 1 and 2 where two sections (a first section, FIG. 1 and a second section, FIG. 2) of the jacket according to Example 3 are shown. When the unmodified nylon jacket was analyzed, no silicon was detected.

It should be understood, of course, that the foregoing relates only to certain embodiments of the present invention and that numerous modifications or alterations may be made therein without departing from the spirit and the scope of the invention. All of the publications or patents mentioned herein are hereby incorporated by reference in their entireties.

We claim:

1. A THHN electrical cable comprising:

an electrical conductor;

an insulating layer surrounding the electrical conductor; and a jacket surrounding the insulating layer, wherein the jacket is a thermoplastic material comprising:

from 80 to 95% by weight of a polyamide;

from 2.5 to 17% by weight of a silicon elastomer, wherein the silicon elastomer is a VMQ silicon elastomer having a Shore A hardness of from 35 to 75; and from 0.75 to 10% by weight of an ethylene polymer modified with an aliphatic diacid anhydride, wherein the THHN electrical cable requires 50 to 65% less force to install through a PVC conduit than a THHN electrical cable with a jacket without the silicone elastomer incorporated therein.

2. The THHN electrical cable of claim 1, wherein the silicon elastomer does not migrate through the jacket.

3. The THHN electrical cable of claim 1, wherein the THHN electrical cable with the jacket has a lower coefficient of friction than a THHN electrical cable with a jacket without the silicon elastomer incorporated therein.

4. The THHN electrical cable of claim 1, wherein the VMQ silicon elastomer has a Shore A hardness of from 60 to 75.

5. The THHN electrical cable of claim 1, wherein the VMQ silicon elastomer is selected from the group consisting of dimethylvinyl terminated, dimethyl methylvinyl siloxane, mixed cyclosiloxanes, octamethylcyclotetrasiloxane, dimethyl methoxy terminated siloxanes and silicons and combinations thereof.

6. The THHN electrical cable of claim 1, wherein the polyamide is nylon 6 or nylon 66.

7. The THHN electrical cable of claim 1, wherein the ethylene polymer modified with an aliphatic diacid anhydride is selected from the group consisting of maleic anhydride-modified high-density polyethylene, maleic anhydride-modified linear low-density polyethylene, and combinations thereof.

* * * * *